United States Patent
Zhao et al.

(10) Patent No.: US 8,601,898 B2
(45) Date of Patent: Dec. 10, 2013

(54) DECELERATION MECHANISM

(75) Inventors: Zhi-Ming Zhao, Shenzhen (CN);
Guo-Qing Zhang, Shenzhen (CN);
Chia-Peng Day, Santa Clara, CA (US)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 809 days.

(21) Appl. No.: 12/781,999

(22) Filed: May 18, 2010

(65) Prior Publication Data
US 2011/0233007 A1    Sep. 29, 2011

(30) Foreign Application Priority Data
Mar. 23, 2010    (CN) .......................... 2010 1 0130422

(51) Int. Cl.
*B25J 17/02*    (2006.01)
(52) U.S. Cl.
USPC ........................................ 74/490.01; 74/89.2
(58) Field of Classification Search
USPC ............. 74/490.01, 490.05, 490.06; 188/65.1
See application file for complete search history.

(56) References Cited

U.S. PATENT DOCUMENTS

| | | | | |
|---|---|---|---|---|
| 2,212,823 A * | 8/1940 | Bulk | ......................... | 74/501.5 R |
| 4,236,696 A * | 12/1980 | Hicks et al. | ................... | 254/297 |
| 4,351,197 A * | 9/1982 | Carson | ......................... | 74/89.22 |
| 4,507,979 A * | 4/1985 | Zebrowski | ................... | 74/89.22 |
| 4,796,478 A * | 1/1989 | Carson | ......................... | 74/89.2 |
| 5,105,672 A * | 4/1992 | Carson et al. | ................ | 74/89.22 |
| 5,207,114 A * | 5/1993 | Salisbury et al. | .......... | 74/479.01 |
| 5,333,986 A * | 8/1994 | Mizukami et al. | ........... | 414/217 |
| 5,388,480 A * | 2/1995 | Townsend | ................ | 74/501.5 R |
| 5,407,395 A | 4/1995 | Kramer et al. | | |
| 5,429,015 A * | 7/1995 | Somes | ......................... | 74/665 B |
| 5,553,509 A * | 9/1996 | Somes | ......................... | 74/89.2 |
| 5,562,556 A * | 10/1996 | Carson | ......................... | 474/62 |
| 5,778,730 A * | 7/1998 | Solomon et al. | ........... | 74/490.04 |
| 6,622,580 B1* | 9/2003 | Chang et al. | ...................... | 74/63 |
| 7,021,167 B2* | 4/2006 | Liesegang | ......................... | 74/63 |
| 7,367,245 B2* | 5/2008 | Okazaki et al. | ............ | 74/490.04 |
| 8,004,228 B2* | 8/2011 | Somes | ..................... | 318/568.11 |

FOREIGN PATENT DOCUMENTS

KR    1020040035354 A    5/2006

* cited by examiner

*Primary Examiner* — Robert A Siconolfi
*Assistant Examiner* — James Hsiao
(74) *Attorney, Agent, or Firm* — Altis Law Group, Inc.

(57) ABSTRACT

A deceleration mechanism comprises a driving wheel, a driven wheel of a diameter exceeding that of the driving wheel, a transmission member coiling around the driving wheel and the driven wheel; and a tension assembly fixed to the driven wheel. The transmission member coils around the driving wheel, criss-crosses, and coils around the driven wheel. The tension assembly is arranged between the transmission member and the driven wheel and elastically resists the transmission member and the driven wheel.

15 Claims, 5 Drawing Sheets

DECELERATION MECHANISM

BACKGROUND

1. Technical Field

The present disclosure generally relates to robotics and, particularly, to a deceleration mechanism used in a robot.

2. Description of Related Art

Deceleration mechanisms are widely used in industrial robotics and other applications. A deceleration mechanism often consists of a plurality of meshing gears with different diameters.

A commonly used deceleration mechanism includes an inner gear arranged in a shell, a crankshaft with an eccentrically rotating portion arranged in the shell, and a cycloidal gear sleeving on the eccentrically rotating portion. The cycloidal gear rotates about the eccentrically rotating portion, and the cycloidal gear not only meshes with the inner gear but also performs a revolution, and thereby generating an output speed lesser than an input rotating speed. However, to achieve higher degree of meshing and steadier output, the cycloidal gear of the deceleration mechanism frequently forms a plurality of tightly fitted gear teeth on its outer surface. When too many of the gear teeth are formed on a deceleration mechanism of reduced size, each gear tooth becomes very small, and with clearances between neighboring gear teeth becoming also very small, thereby leading to overlapping interference between roots of the neighboring gear teeth. Therefore, the cycloidal gear and the gear teeth are very difficult to manufacture, presenting higher cost and have more complicated structure.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
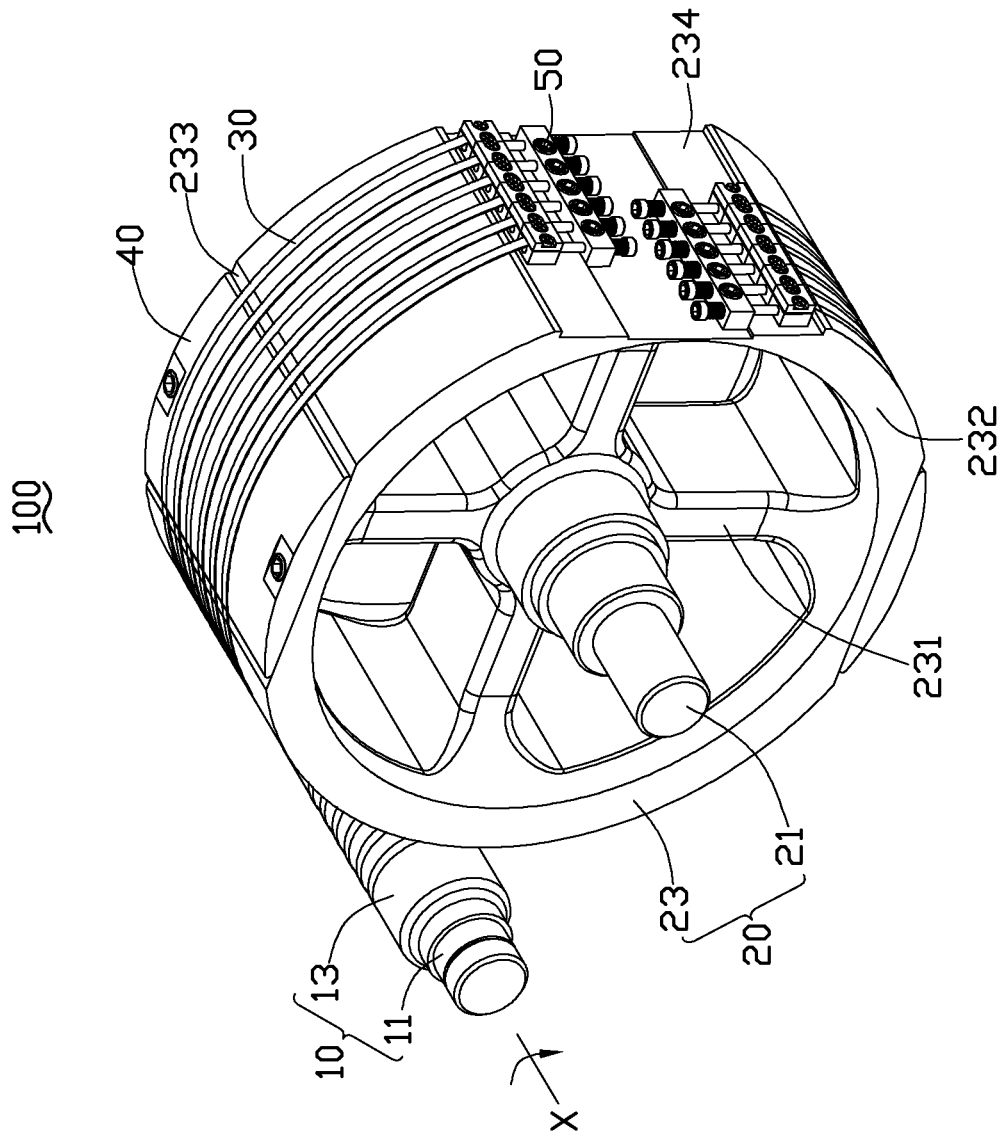
FIG. 1 is an assembled, isometric view of a deceleration mechanism as disclosed, including a driving member, a driven member, a transmission device, and a tension assembly.

Referring to FIG. 1, a deceleration mechanism 100 used in a robot includes a driving member 10, a driven member 20, five transmission members 30, a tension assembly 40, and a plurality of fixing assemblies 50. The transmission members 30 are coiled around the driving member 10 and the driven member 20. The tension assembly 40 is connected to the driven member 20 and is arranged between the driven member 20 and the transmission members 30.

The driving member 10 includes a driveshaft 11 and a driving wheel 13 arranged around the outside of the driveshaft 11.

Figure 2:
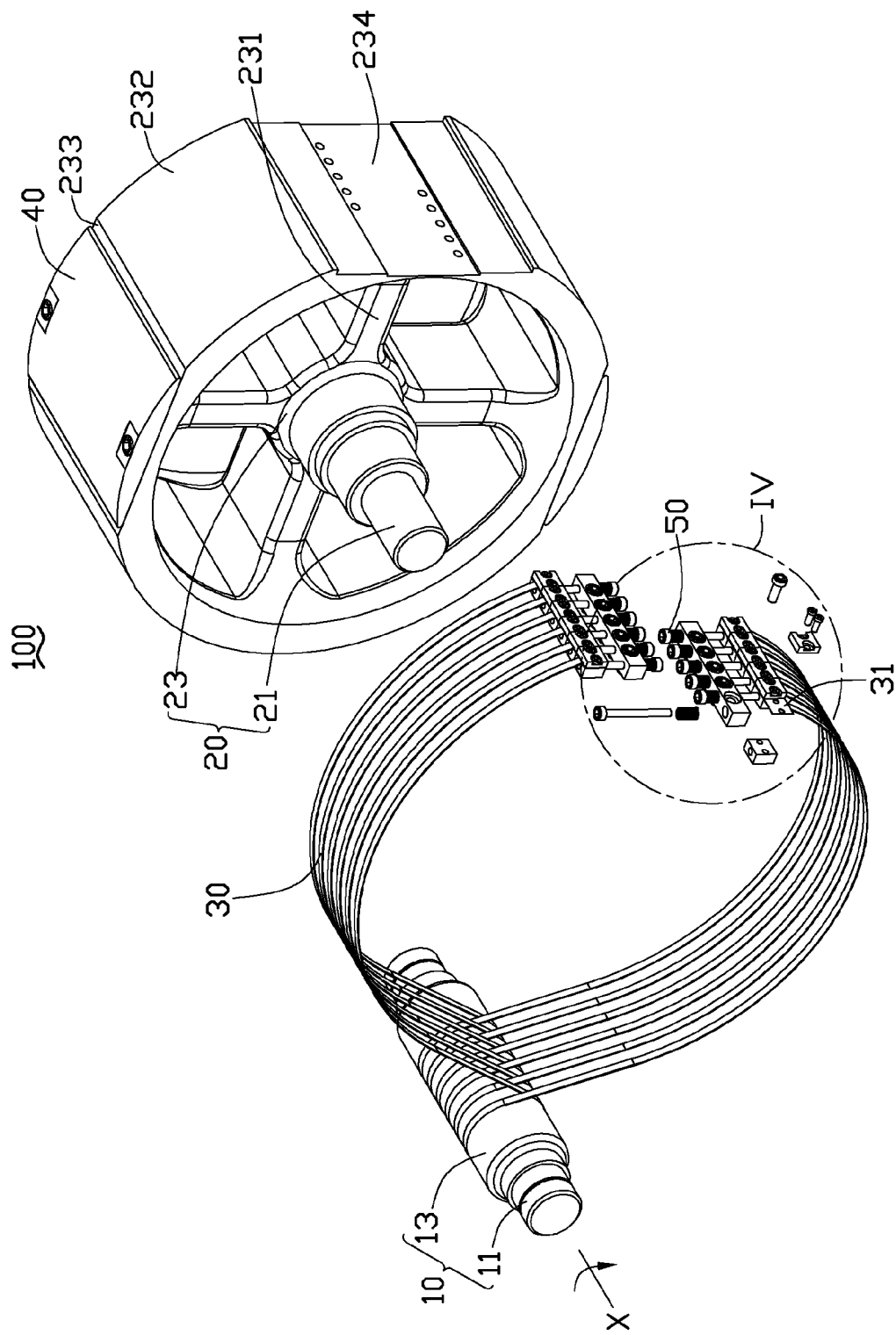
FIG. 2 is an exploded, isometric view of the deceleration mechanism of FIG. 1.
Figure 3:
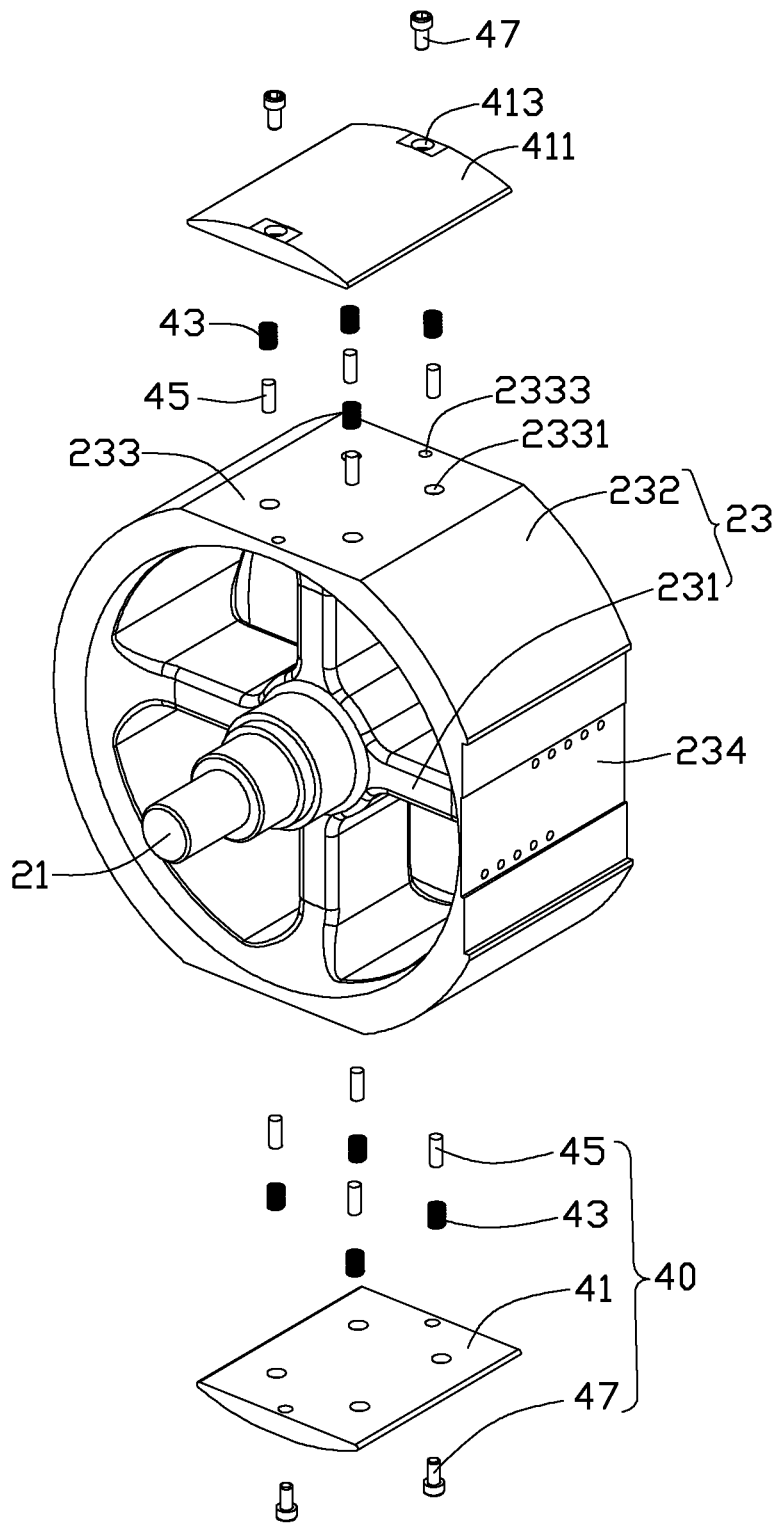
FIG. 3 is an exploded, isometric view of a driven wheel and a transmission member utilized by the deceleration mechanism of FIG. 1.

Referring to FIGS. 2 and 3, the driven member 20 includes a driven shaft 21 and a driven wheel 23 rotatably sleeved on the driven shaft 21. The driven wheel 23 includes a wheel body 231 sleeved on the driven shaft 21 and a wheel casing 232 sleeved outside of the wheel body 231. The wheel casing 232 forms two receiving portions 233 and defines a latching slot 234 along a radial direction. Each receiving portion 233 is a flat surface. The driven member 20 further defines four receiving holes 2331 and two threaded holes 2333 at each flat surface toward the inside of the driven wheel 23. The latching slot 234 is arranged between the receiving portions 233. The wheel body 231 and the wheel casing 232 can be of the same or different materials. In this illustrated embodiment, the wheel body 231 and the wheel casing 232 are made of different materials, with the wheel body 231 having a lesser material density than the wheel casing 232. The wheel body 231 is made of aluminum alloy, and the wheel casing 232 is made of steel, thus, the driven wheel 23 has both the requisite strength and lighter weight, thereby reducing the rotation inertia thereof. In the illustrated embodiment, a diameter of the driven wheel 23 is six times that of the driving wheel 13.

The transmission members 30 are parallel and coiled around the driving wheel 13 and the driven wheel 23 with a "∝" shape. Each transmission member 30 coils one winding or loop around the driving wheel 13, then criss-crosses and coils around the driven wheel 23. Each transmission member 30 has two connecting ends 31. The transmission member 30 may be a wire cable, a steel belt, or other material having sufficient strength. In the illustrated embodiment, the transmission member 30 is a steel belt, capable of providing higher transmission precision, improved rigidity and steadier transmission. There may further be any number of transmission members 30, additionally influencing strength thereof.

The tension assembly 40 includes a resisting member 41, four first resilient members 43, four guiding bars 45, and two connecting members 47. The resisting member 41 includes a resisting surface 411 and defines a connecting hole 413. The resisting surface 411 is curved with a substantially the same radius as that of the wheel casing 232 of the driven wheel 23. Thus, the resisting surface 411 of the resisting member 41 can connect with the outer surface of the wheel casing 232 smoothly. The first resilient member 43 is a compression spring, sleeved on the guiding bar 45. Each resilient member 43 and guiding bar 45 are received in one receiving hole 2331 of the driven member 20. The connecting member 47 is a fastener which is extending through the connecting hole 413 of the resisting member 41 and received in the threaded hole 2333 of the driven member 20. The diameter of the connecting hole 413 exceeds that of the connecting member 47, thus, the resisting member 41 can slide along the connecting member 47.

Figure 4:
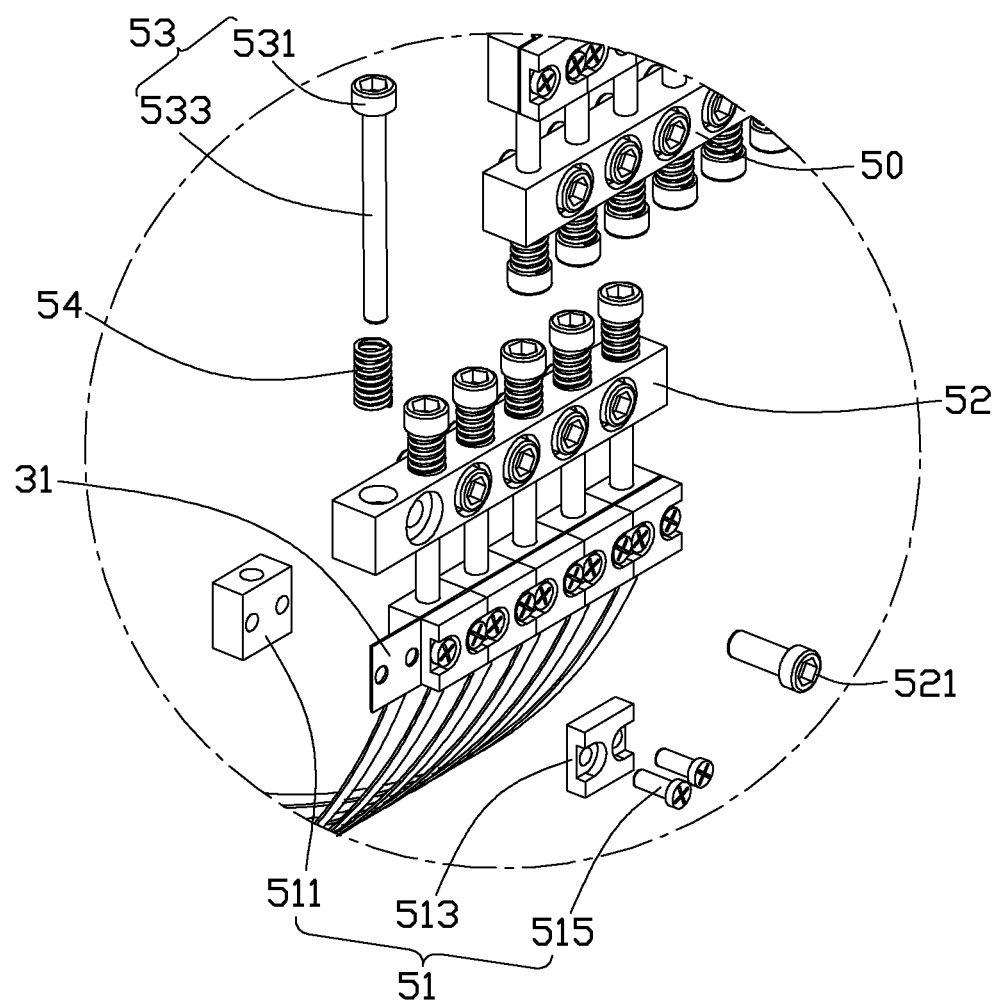
FIG. 4 is an enlarged view of a circled portion IV of FIG. 2.
Figure 5:
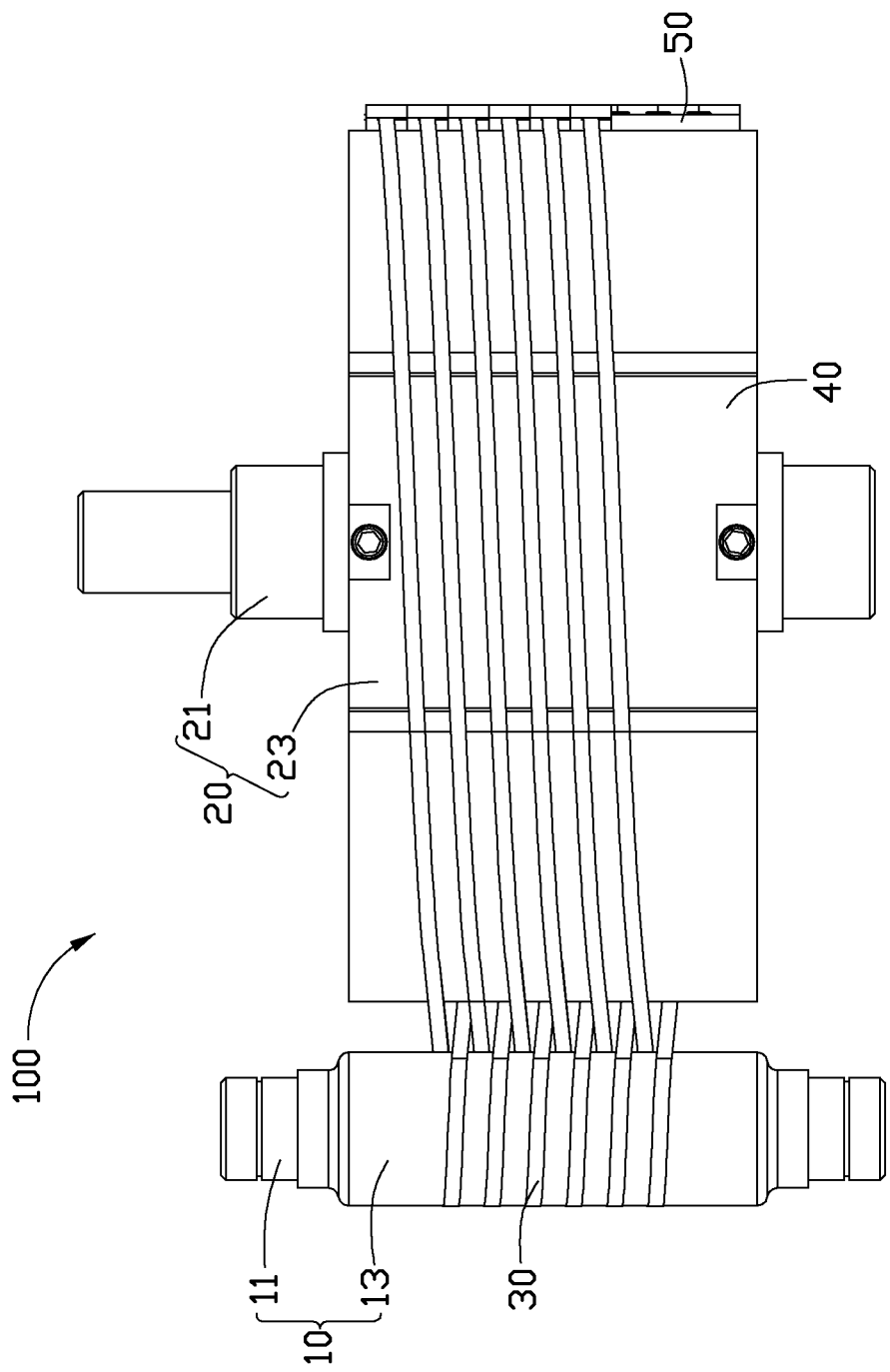
FIG. 5 is a plan view of the deceleration mechanism of FIG. 1.

Referring to FIGS. 3 and 4, each fixing assembly 50 includes an active member 51, a positioning member 52, an adjustment member 53, and a second resilient member 54. In the illustrated embodiment, two fixing assemblies 50 are positioned at opposite ends of the latching slot 234 of the driven wheel 23, respectively. The active member 51 includes a first latching portion 511, a second latching portion 513, and a plurality of fastener 515 connecting the first latching portion 511 to the second latching portion 513. The positioning member 52 is connected to the driven wheel 23 by a plurality of fasteners 521. The adjustment member 53 is a fastener, which includes a head 531 and a post 533. The second resilient member 54 is a compression spring, sleeving on the adjustment member 53. Opposite ends of the second resilient member 54 resist the head 531 of the adjustment member 53 and the positioning member 52, respectively.

Referring to FIGS. 2 through 5, during assembly of the deceleration mechanism 100, the first resilient member 43 of the tension assembly 40 sleeves on the guiding bar 45 and is received in the receiving hole 2331 of the driven member 20. The resisting member 41 is connected to the receiving portion 233 of the driven member 20, with the connecting member 47 received in the threaded hole 2333 of the driven member 20. For effective assembly, the connecting member 47 received in the threaded hole 2333 should be long enough so that the first resilient member 43 can be compressed by a significant degree. The transmission member 30 coils one winding or loop around the driving wheel 13 of the driving member 10, then criss-crosses and coils around the outer surface of the wheel casing 232 of the driven wheel 23. The transmission member 30 criss-crosses between the driving wheel 13 and the driven wheel 23, thus, substantially forming a "∝" shape. Each connecting end 31 of the transmission member 30 is fixed by one active member 51. The connecting end 31 is arranged between the first latching portion 511 and the second latching portion 513. The fasteners 515 connects the first latching portion 511 to the second latching portion 513, thus, the connecting end 31 is fixed. The positioning member 52 is arranged in the latching slot 234 of the driven member 20 by the fasteners 521. The post 533 of the adjustment member 53 extends through the second resilient member 54 and the positioning member 52, and are received in the active member 51, thus, the connecting ends 31 of the transmission member 30 are connected to the driven member 20. The connecting ends 31 of the transmission member 30 are staggered to provide a height difference, thus preventing the transmission member 30 from contacting itself at the intersections, thereby avoiding attendant friction and extending service life.

A portion of the connecting member 47 of the tension assembly 40 may be withdrawn away from the threaded hole 2333 of the driven member 20, thus, permitting the resisting surface 411 of the resisting member 41 to resist the transmission member 30, thereby increasing the frictional force created therebetween.

During operation of the deceleration mechanism 100, a driving device (not shown) rotates the driving wheel 13, and in the illustrated embodiment, the driving wheel 13 rotates in X direction, which is clockwise, and sets one transmission member 30. When the driving wheel 13 rotates in the X direction, a portion of the transmission member 30 coiled around the driving wheel 13 may then coil around the driven wheel 23, and another portion of the transmission member 30 adjacent to the driving wheel 13 may be pulled out from the driven wheel 23 and coiled around the driving wheel 13. Friction between the transmission member 30 and the driving wheel 13 and between the transmission member 30 and the driven wheel 23 rotates the driven wheel 23 opposite to the X direction. When the driving wheel 13 has rotated a default number of windings, the driving device rotates the driving wheel 13 in a reverse direction to the X direction, and the driven wheel 23 then rotates in the X direction correspondingly. Rotation of the driving wheel 13 and the driven wheel 23 is the same as described. The driving wheel 13 and the driven wheel 23 have different diameters, and the driven wheel 23 rotates one winding after the driving wheel 13 rotates the default number of windings, thus, deceleration is achieved.

The deceleration mechanism 100 achieves deceleration using the transmission members 30 coiling around the driven wheel 23 and the driving wheel 13. There is no need for a gear wheel or other complicated structures, and the manufacturing cost is lower. Windings with a "∝" shape increase the contact length of the transmission member 30, the driving wheel 13, and the driven wheel 23, and increase the friction between the transmission member 30 and the driving wheel 13 and between the transmission member 30 and the driven wheel 23, respectively.

The tension assembly 40 can increase the friction in a transmission process. The first resilient member 43 enables the resisting member 41 to resist the transmission member 30 snugly. The transmission member 30 may loosen, and the elastic force created by the first resilient member 30 can push on the resisting member 41 to resist the transmission member 30. The resisting surface 411 of the resisting member 41 is curved when the resisting member 41 is fixed to the driven wheel 23, thus the resisting surface 411 can connect with the outer surface of the driven wheel 23 smoothly, and the transmission member 30 coils substantially on one circumferential surface to generate a constant transmission ratio.

In addition, elastic force created by the second resilient member 54 of the fixing assembly 50 helps to maintain the firmness or snugness of the transmission member 30. When the transmission member 30 loosens, the adjustment member 53 can be used to resist the second resilient member 54 and restore firmness or tightness.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A deceleration mechanism, comprising:
   a driving wheel;
   a driven wheel of a diameter exceeding a diameter of the driving wheel;
   at least one transmission member coiling around the driving wheel and criss-crossing and coiling around the driven wheel; and
   at least one tension assembly fixed to the driven wheel, arranged between the at least one transmission member and the driven wheel and elastically resisting the at least one transmission member and the driven wheel,
   wherein the at least one tension assembly comprises a resisting member and a plurality of first resilient members; the driven wheel comprises a receiving portion to which the resisting member are connected; and the first resilient members are arranged between the receiving portion and the resisting member, the resisting member comprises a resisting surface which is curved and having a radius substantially the same as the radius of the driven wheel, and the at least one transmission member coils around the driven wheel and the resisting member.

2. The deceleration mechanism of claim 1, wherein the receiving portion defines a receiving hole; the at least one tension assembly further comprises a guiding bar partially received in the receiving hole of the driven wheel, and the first resilient members sleeve on the guiding bar.

3. The deceleration mechanism of claim 1, wherein the at least one transmission member comprises two connecting ends; the deceleration mechanism further comprises at least one fixing assembly, and the at least one fixing assembly fixes the connecting ends of the at least one transmission member and is connected to the driven wheel.

4. The deceleration mechanism of claim 3, wherein the at least one fixing assembly comprises a positioning member fixed to the driven wheel, an active member, and an adjustment member connecting the positioning member to the active member; the connecting ends of the at least one transmission member are fixed to the active members.

5. The deceleration mechanism of claim 4, wherein the at least one fixing assembly further comprises a second resilient member; the adjustment member comprises a head and a post, and the second resilient member sleeves on the post of the adjustment member and is arranged between the head of the adjustment member and the positioning member.

6. The deceleration mechanism of claim 5, wherein the active member comprises a first latching portion, a second latching portion, and a plurality of fastener; wherein the connecting end of the at least one transmission member is arranged between the first latching portion and the second latching portion, and is fixed by the fasteners.

7. The deceleration mechanism of claim 3, wherein the driven wheel defines a latching slot; two fixing assemblies are arranged at opposite ends of the latching slot; and each connecting end of the at least one transmission member is fixed to one fixing assembly.

8. The deceleration mechanism of claim 1, wherein the at least one transmission member is a steel belt.

9. A deceleration mechanism, comprising:
a driving assembly comprising a driving wheel; and
a driven assembly comprising a driven wheel of a diameter exceeding a diameter of the driving wheel;
at least one transmission member coiling around the driving wheel and the driven wheel, wherein a height difference of opposite ends of the at least one transmission member is generated after the at least one transmission member coils around the driving wheel; and
at least one tension assembly arranged between the at least one transmission member and the driven wheel and elastically resisting the transmission member and the driven wheel,
wherein the at least one transmission member comprises two connecting ends; the deceleration mechanism further comprises at least one fixing assembly, and the at least one fixing assembly fixes the two connecting ends and is connected to the driven wheel, the at least one fixing assembly comprises a positioning member fixed to the driven wheel, an active member, and an adjustment member connecting the positioning member to the active member; opposite ends of the at least one transmission member are fixed to the active member, the at least one fixing assembly further comprises a second resilient member; the adjustment member comprises a head and a post; the second resilient member sleeves on a post of the adjustment member and is arranged between the head of the adjustment member and the positioning member.

10. The deceleration mechanism of claim 9, wherein the at least one tension assembly comprises a resisting member and a plurality of first resilient members; the driven wheel comprises a receiving portion to which the resisting member is connected, and the first resilient members are arranged between the receiving portion and the resisting member.

11. The deceleration mechanism of claim 10, wherein the resisting member comprises a resisting surface which is curved and having a radius substantially the same as that of the driven wheel.

12. The deceleration mechanism of claim 10, wherein the receiving portion defines a receiving hole; the at least one tension assembly further comprises a guiding bar partially received in the receiving hole of the driven wheel, and the first resilient members sleeve on the guiding bar.

13. The deceleration mechanism of claim 9, wherein the active member comprises a first latching portion, a second latching portion, and a plurality of fasteners; the end of the at least one transmission member is arranged between the first latching portion and the second latching portion, and is fixed by the fasteners.

14. The deceleration mechanism of claim 13, wherein the driven wheel defines a latching slot, two fixing assemblies are arranged at opposite ends of the latching slot, and each connecting end of the at least one transmission member is fixed to one fixing assembly.

15. The deceleration mechanism of claim 9, wherein the at least one transmission member is a steel belt.

\* \* \* \* \*